April 23, 1957

D. C. GLASS 2,789,573

WATER CONDITIONING SYSTEM WITH CONSTANT
DOSAGE OF THE CONDITIONING AGENT

Filed Aug. 26, 1953

Donald C. Glass
INVENTOR.

BY

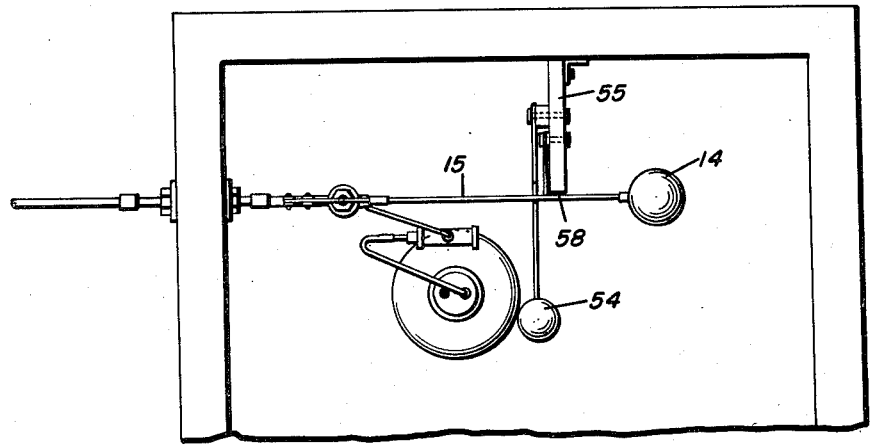
Fig. 4
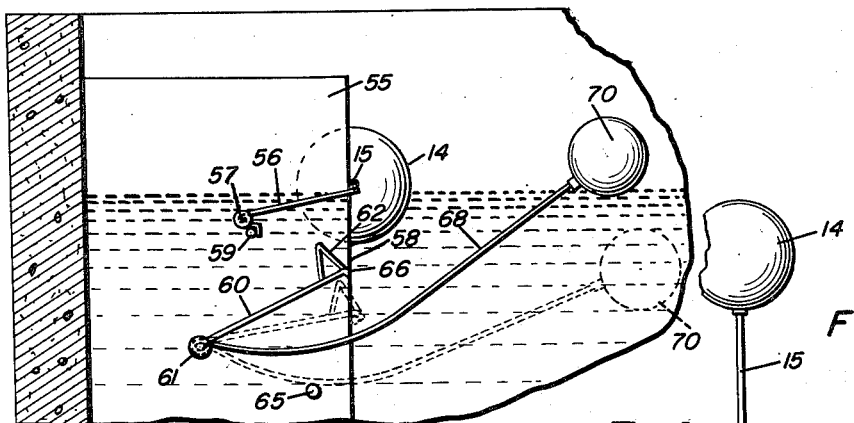
Fig. 5
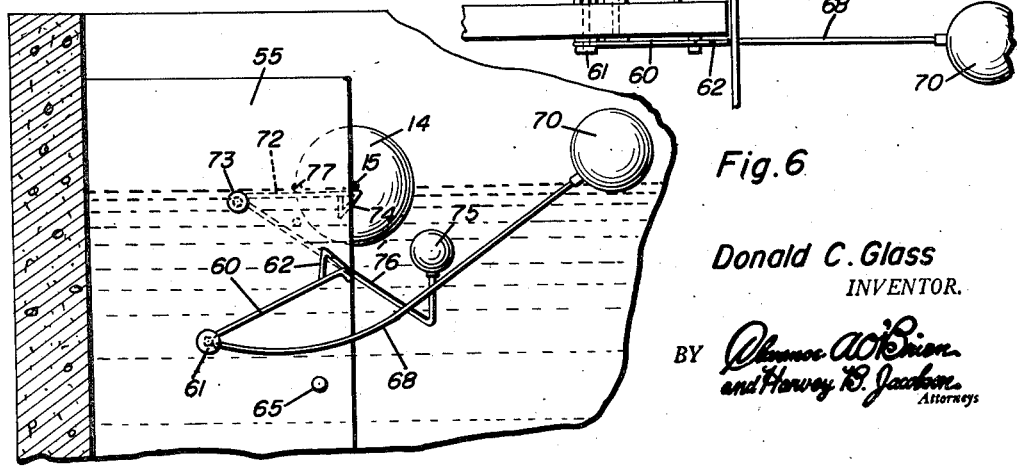
Fig. 7
Fig. 6
Donald C. Glass
INVENTOR.

United States Patent Office 2,789,573
Patented Apr. 23, 1957

2,789,573

WATER CONDITIONING SYSTEM WITH CONSTANT DOSAGE OF THE CONDITIONING AGENT

Donald C. Glass, Jamestown, Ohio

Application August 26, 1953, Serial No. 376,613

4 Claims. (Cl. 137—101.27)

This invention relates to dispensing arrangements for water conditioning systems, and it has for its main object to provide means for supplying a water container or tank which is emptied or depleted at irregular intervals and which is automatically refilled after such depletion, such as, for instance, a livestock watering tank, with a fluid agent in a manner so regulated that the concentration of the said agent in the tank and the proportion of the addition relative to the unit of volume of water in the tank will be strictly constant.

It is sometimes found to be necessary or of great advantage to add a therapeutic, prophylactic, dietetic, nutritive, disinfecting or similar agent to the drinking water either to cure diseases or to prevent them or to overcome deficiencies of the available feed in vitamins or the like, or to prevent the spread of bacteria and of other microorganisms through the drinking water. When such agents are added either in the form of fluids or of solutions or suspensions, it is nearly always necessary to maintain the concentration of the agent in the fluid into which it is introduced, for instance, in the drinking water, or the dosage of the active agent within the drinking water at a constant level, because dosages which are smaller than prescribed are usually not effective and over dosages may be harmful. Such additions are therefore usually made by adding predetermined quantities to a reservoir or tank holding a certain fixed volume of the water or other fluid to which the agent is added. Such a method is, however, not applicable in connection with the drinking water for livestock and in similar cases, for its application would entail so much additional installations and so much supervision that it must be considered as economically unsound.

Drinking water for livestock is usually supplied from small local sources directly to a watering tank and the tank is maintained filled by means of an automatic pumping arrangement which usually supplies water just to the necessary extent to keep the tank at a predetermined level. The filling of the tank is therefore conditioned by its depletion and, especially where an automatic supply means is used, depletion, bringing the water level below a certain mark, starts the filling operation, which is automatically stopped when a certain predetermined level of the tank has again been reached. Filling of the tank thus occurs at completely irregular intervals and the volume of water supplied during such filling operations varies irregularly.

It will be clear that to maintain a constant concentration of a therapeutic, or prophylactic, dietetic, nutritive or other agent in such a tank is a rather specialized problem and that the addition of the aforesaid agents under such conditions cannot be obtained by means of a dosage measuring arrangement so far known.

It is therefore the main object of the invention to provide a dispensing arrangement for fluid agents of the aforementioned type which will maintain a constant dosage of the effective agent per unit of volume of the drinking water in the tank.

Accordingly, the addition of an exact dosage of the agent is obtained and a constant concentration or dosage by volume unit in the tank is maintained by means of an apparatus that supplies a predetermined quantity of the effective agent to the inflowing water supply of the tank, making, however, said predetermined quantity dependent upon the rate of flow supplying the tank. This is best obtained by means of an injection device, preferably adjustable, and by means of calibrated openings or bores determining the delivery of the therapeutic or other agent.

Within certain limits, therefore, the dosage will always be proportional to the influx of water into the watering tank, and thus the same concentration will be maintained within the tank by virtue of the fact that the supply shows a constant concentration of the added agent per volume unit, within certain limits.

A further problem, however, arises in connection with the limits within which the rate of the inflow of water may vary without producing a variation of the dosage of the added beneficial agent. It has been found in actual practice that with a livestock watering tank, for instance, the variation in the rate of flow under different conditions (for instance, when a single animal uses a tank occasionally and when a large number of animals of a herd use the tank simultaneously, as is the case during certain periods of a day) varies so greatly that the proportionality under such varying conditions could not be maintained.

According to the invention, therefore, further means are provided to secure an influx of water at approximately the same rate under all known conditions.

The object of the invention will therefore be clear from the above explanation. It consists in providing means for maintaining a constant proportionality between a fluid containing the desired agent and the quantity of water flowing into a tank at irregular intervals which are determined by the irregular water consumption.

Further objects consist in producing and maintaining the said proportionality or dosage of the agent relative to the inflowing quantities of water by making the addition dependent on the rate of inflow of the water into the tank during the filling of the same. A further object of the invention consists in securing a nearly constant rate of inflow subjected only to a relatively small variation under widely different conditions.

Further and more specific objects will be apparent from the following specification.

The invention is illustrated in the accompanying drawing showing two modifications of a tank and dispensing apparatus embodying the invention. It is, however, to be understood that these modifications are shown by way of example only and that the examples given are not limitative and do not represent a survey of the possible modifications. A departure from the example which has been illustrated in the drawings is therefore not necessarily a departure from the principle of the invention, as the drawings mainly intend to provide a basis for the explanation of the principle of the invention and the best mode of the application of this principle.

In the drawings:

Figure 4 is a plan view of that portion of a tank which contains the dispensing device and the float arrangement operating the automatic supply of the tank with water.

Figure 5 is a fragmentary, partly sectional and elevational view of the float arrangement shown in Figure 4, illustrating various positions of the floats.

Figure 6 is a fragmentary, partly sectional, elevational view of the tank provided with a modified float arrangement.

Figure 7 is a plan view illustrating a portion of the float arrangement shown in Figure 6.

Figure 1:
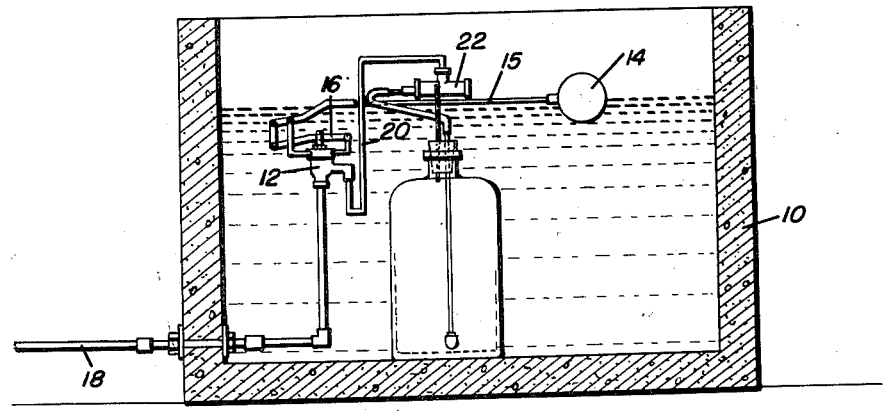
Figure 1 is an elevational, partly sectional view of a tank provided with a dispensing device according to the invention.

The principle of the invention will be best understood by referring to the above explanation of the invention and to the drawings.

In the modification illustrated in Figures 1, 2, 3 and 4, a stock tank 10 for watering livestock is shown by way of example, which is preferably provided with a single supply valve 12 having a single opening, controlled by said valve, which valve is operated by means of a main float 14 connected with a pivoted float lever 15 and a lever system 16 which operates the valve in a well known manner. The main float 14 operates the system of auxiliary or trigger floats which will be described below.

Figure 2:
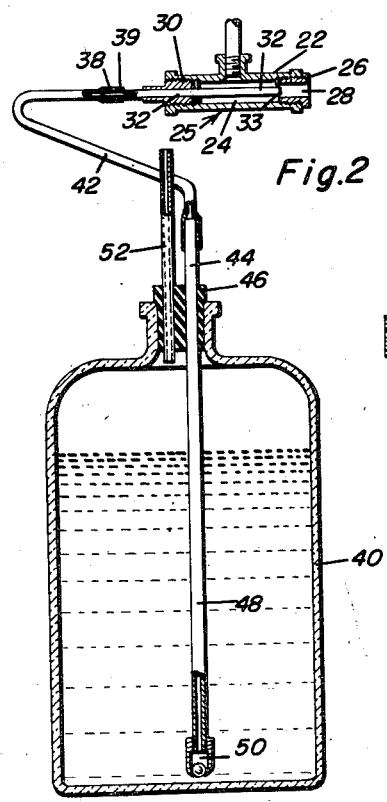
Figure 2 is an elevational sectional view of the dispensing device and of its connection with the water supply of the tank.

The valve 12 controls the fluid admission to the stock tank through the line 18 leading from the water supply, while the pipe line 20 leading from the valve to the tank is connected with a water outlet, preferably arranged above the water level of the tank which is normally reached, said water outlet being in the shape of a fitting or sleeve 22 which may be, for instance, a T-fitting as shown in Figure 2 of the drawings. The interior of the said fitting or sleeve 22 forms a chamber 24 of an injector device, generally indicated at 25.

The sleeve or fitting 22 is provided at one end with a plug 26 closing the sleeve, which plug has a central bore 28. Through a second plug 30 at the other end of the sleeve or fitting 22, a pipe 32, which may consist of a plastic material, is admitted, which pipe passes through and fits exactly into a bore 34 in said plug 30, and passes through the chamber 24 axially and ends just within the entrance end of the bore 28 of plug 26. The tubing 32 is of a diameter which is smaller than that of the bore 28, so that an annular cross-section 33 remains free through which the water supplied to the chamber 24 through the pipe 20 may pass.

It will be seen that the position of the section of the tube 32 which projects into the bore 28 may be adjusted so that it may project more or less into the said bore.

The plastic tubing 32 leads to the container 40 for the medicine, therapeutic, prophylactic, dietetic or other agent to be introduced into the tank in quantities which are proportional to the fluid intake of the tank.

Within the tubing 32 a calibrating plug 38 is arranged, provided with a calibrating opening 39 which determines the quantity of fluid passing through the pipe or tubing 32. The tube section 32 which is provided with a plug 38 is joined to a further, preferably flexible section 42 by means of which connection is made with a tube 48 at section 44 passing through the stopper 46 of the container 40 which reaches approximately down to the bottom of the container 40. Near the bottom of the container a non-return valve 50 is arranged on the tube 48 which permits entry of the fluid into the tube but which prevents any accidental backflow of fluid which may have entered the tube 48. Moreover, this valve 50 keeps the tube 48, pipe 42 and tube 32 filled with fluid.

A second tube 52 may lead from the outside through the stopper 46 into the container through which air from the outside may be admitted into the interior of the container 40.

The arrangement described is an injector device in which the water which is pumped into the tank 10 through the supply line 18 under some pressure, after having passed through valve 12, enters into the tank through the chamber 24 and the restricted opening 28 after having passed through the restricted cross-section 33 surrounding the tubing 32. During the passage through the restricted cross-section, the speed of the flow of water to the tank will be accelerated and a suction will be developed in tube 32.

The quantity of the fluid which forms the flow of liquid from the container 40 may be regulated by changing the distance of the end of tube 32 from the entrance end of the bore 28 in plug 26, by changing the calibrating plug 38, using plugs with calibrated openings of different diameters, or by changing the diameter of bore 28 of plug 26.

Figure 3:
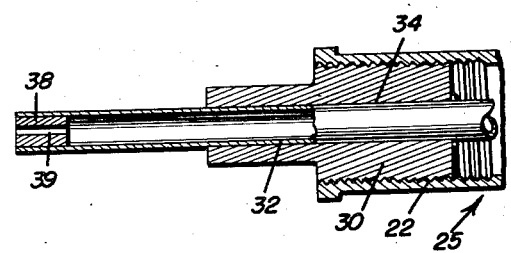
Figure 3 is a fragmentary sectional elevational view of a detail.

While the calibrating plug is easily changed if arranged in the manner shown in Figure 3 when inserted at the end of the tube section 32, the change in the bore 28 of plug 26 may be obtained by providing different plugs 26 with screw threads engaging corresponding screw threads in the member 22.

It has already been explained that an auxiliary float or float system is arranged in order to secure the same rate of delivery of the fluid containing a therapeutic or other agent under different conditions of withdrawal of water from the tank and with different states of depletion of the tank. The rate of delivery of the fluid containing the desired agent is dependent on the speed of the water inflow which must therefore be kept at a constant or approximately constant value, whatever the rate of withdrawal of water from the tank. Obviously, if water is withdrawn slowly, for example, the downward movement of the float 14 is also slow, and either considerable time will elapse until this float opens the valve 12 completely or the valve may even never be opened to the full extent, if the influx of water is sufficient to balance the quantity which is slowly withdrawn. Conversely, a rapid withdrawal of water from the tank will produce a rapid downward movement of the float, and a full opening of the valve 12 occurs almost instantly.

As the fluid containing the medicine or other additional agent is however drawn in by suction, the quantity drawn in is materially different in the case of a slow inflow of water and in the case of a rapid inflow even if the same quantity of water is withdrawn in both cases. This is due to the fact that in the last-named case the flow of the water to the bore 28 will be more energetic and therefore will produce a more energetic ejector action. If, therefore, the various calibrated openings, the diameters of the bores, the position of the tubing, etc. are adjusted for a certain rate of withdrawal of water from the tank, the influx of the additional fluid through the injector will always be out of proportion to the quantity of water supplied to the tank if the flow conditions do not correspond to this adjustment.

The various controls are therefore not directly operated by the movement of the main float as such, following the movement of the water level, but are under control of locking members cooperating with a trigger float which regulates the movement of the main float. The locking member and the trigger float form an inflow rate equalizing device which permits the operation of the main float only, after the difference between the level of the water in the tank and the level at which the float is balanced has reached a predetermined value. The inflow thus occurs regularly under the same hydraulic pressure. This trigger float system is shown in Figures 4 and 5 of the drawings.

As will be seen from this figure, the float system regulating the rate of flow through the valve 12 consists of the main float 14 and of the auxiliary or trigger float 70, which floats cooperate with a number of locking and releasing members.

The tank 10 is provided with a board 55 attached to it or with a vertical wall projecting from the tank wall inwardly into the tank which has a vertical end face 58. On this board or wall 55 a locking spring 56 is mounted which may consist of a leaf spring ending in a small coil spring wound around the pivot pin 57 around which the said spring may move, the coil end being held by another pin 59. The end of the locking spring 56 projects just a little above the normal level of the water in the tank. It is arranged at right angles to the float lever 15 and projects just sufficiently in its position of rest towards said float lever to support the float lever in its uppermost or normal position, which is the position of rest which the float lever occupies when the tank has been filled to the desired extent.

The locking spring will have a tendency to move upwardly into this position if moved downwardly from its position of rest by the float lever.

The board 55 is so arranged in the tank that its vertical end face 58 forms a kind of vertical guide along which the float lever 15 may move upwardly and downwardly. It will also be seen that the spring 56 projects only slightly beyond the edge of the vertical face 58 of the board 55.

The spring 56 is so adjusted that it holds the float lever and float 14 in its uppermost position until a certain amount of weight increase has occurred due to the emerging of a larger portion of the float from the water during the sinking of the water level. Further, the end of the spring 56, when moved around the pivot 57, withdraws sufficiently behind the edge of the vertical face 58 of the board 55 to release the float lever 15 and thus permits the free downward movement of the float 14.

Below the locking spring 56 a trigger member 60 is mounted which is pivoted to the board 55 by means of a pivot 61. The trigger member 60 has an end portion 62 which is bent into a triangular or similar shape and this end portion, in the position of rest, projects slightly beyond the vertical end face 58 of the board 55, but when moved downwardly the extent to which the end portion projects beyond the wall 58 increases.

The trigger member 60 is connected with a trigger float 70 by means of a rod or float lever 68 which may be slightly curved as shown in the drawings. The apex of the triangular end portion 62 is in its position in which it only slightly projects beyond the end face 58 when the trigger float 70 is floating on the water and the tank is filled to its desired normal water level.

With this arrangement, the rate of flow through valve 12 which determines the rate of flow through the injector device 25 is approximately kept constant, whatever the state of depletion of the tank or the rate of withdrawal of water from it, which rate may greatly vary in a stock tank for watering livestock according to the number of animals using the stock tank simultaneously and according to the quantity of water taken by an animal at a time.

If it is assumed that the water level has fallen within the tank through withdrawal of water, then the float 14 will still be held in its position for some time until the weight which is added due to the lowering of the water level overcomes the force of the locking spring 56 and moves the spring downwardly, during which movement the spring is also withdrawn behind the end face 58 and thus releases the float lever 15. The float now will suddenly drop, and on account of the acceleration thus acquired it will also pass around the triangular end 62 and apex 66 of the trigger member 60. This member does not project to a large extent in its normal position and the normal looseness of the parts will permit such a passage which, moreover, is aided by the slant of the upper side of the triangular end portion 62 of the trigger member. The float will come to a rest when again submerged to the predetermined extent but cannot move upwardly as it will now be locked below the end of the trigger member 60, as shown in dotted lines in the drawings, and the trigger member will have adopted this locking position during the downward movement of the float, because the trigger float 70 also moves downwardly with the water level and therefore moves the trigger member in its locking position.

The valve 12 is thus opened immediately to the desired extent by the downward movement of the float 14 and is kept in its open position as the float lever 15 is now locked.

When the tank now fills through the valve 12, the trigger float 70 is again moved upwardly, and when again approximately in the position determined by the normal level of the tank, the locking trigger member 60 is withdrawn behind the end wall 58 to such an extent that the float lever 15 is again released and may move upwardly with a certain speed as the float 14 is now completely submerged. The float lever 15 lifts the lock spring 56, moves past it and positions itself on top of the spring slightly above the normal water level.

The float 14 thus has only two positions, in both of which it is locked, and it moves at relatively high speed from one position to the other, whatever the rate of withdrawal of the water from the tank or the state of depletion of the tank.

A stop pin 65 may be arranged in order to limit the downward movement of the trigger float 70 and the moving of the trigger member 60 beyond its locking position.

In Figure 6 of the drawings, a slightly modified arrangement is shown. The trigger float 70, float lever 68, and trigger member 60 having a triangular end portion 62 is the same as that already described in connection with Figures 4 and 5. However, instead of the locking spring member 56 another trigger member 72 having a triangular end portion 74 is arranged which is pivoted at 73. Its movement is controlled by a second trigger float 75 set at a lower level and connected with the trigger member 72 by means of a float lever 76. A stop pin 77 limits the upper movement of the trigger member 72.

The operation of this arrangement is practically the same as that already described. However, the arrangement has more positive action than the arrangement with the spring.

It is easier to set and also allows a greater difference between the two water levels.

The two triggers are preferably arranged on opposite sides of the board 55.

When the water level drops below the normal, the float 14 will still be held by the trigger member 72 until the water level has dropped to such an extent that the second trigger float 75 begins to emerge from the water. Then the float goes down under the pressure of the weight of float 14 and the float lever drops and hooks in under the trigger member 60 as above described. When the original water level has again been reached, the float lever 15 will be released in the manner above described and will move upwardly around the triangular end 74 and seat itself on the upper surface of the member 72.

It will be clear that with this arrangement the injection of therapeutic, prophylactic and dietetic or other agents which are to be used in exact dosage may be made in such a manner that the quantity of the added fluid is always proportional to the quantity of water supplied to the tank.

It will also be understood that minor nonessential changes may be made in this arrangement without in any way departing from the principle of the invention as defined in the annexed claims.

What is claimed as new is:

1. A dispensing system for introducing a liquid conditioning agent into a tank automatically supplied with water at a rate corresponding to the withdrawal of water from the tank by means of a float controlling the water supply, comprising means for conveying the liquid conditioning agent into the tank together with the water supplied to the tank, said means including an ejector solely operated during the inflow of water into the tank and controlled by said float, means for maintaining the quantity of the liquid conditioning agent in exact proportion to the quantity of water supplied to the tank, said last-named means including a releasable locking means for the float for a predetermined upper position and for a predetermined lower position of the float, respectively, releasable by the action of the water in the tank on the float when the water level reaches the predetermined level below and above the level corresponding to the float positions in the predetermined upper and lower locking positions, respectively, a float rod on which the float is mounted, a board member projecting into the tank and having a vertical edge along which the float rod moves, pivot pins holding said elastic means and said locking and releasing means on said board member, the end of said elastic means projecting beyond the vertical edge of the board member to support the float rod in one position of the said elastic means, the end of said elastic means being however withdrawn behind the vertical edge of the wallboard when the elastic means is depressed, the elasticity of the elastic means being selected to counterbalance a predetermined portion of the weight of the float when not submerged so that, upon increase of the weight through emerging of the float from the liquid in the tank, the said elastic means are depressed and cause withdrawal of the float rod supporting end behind the edge of the board member and the release of the float.

2. A dispensing system for introducing a liquid conditioning agent into a tank automatically supplied with water at a rate corresponding to the withdrawal of water from the tank by means of a float controlling the water supply, comprising means for conveying the liquid conditioning agent into the tank together with the water supplied to the tank, said means including an ejector solely operated during the inflow of water into the tank and controlled by said float, means for maintaining the quantity of the liquid conditioning agent in exact proportion to the quantity of water supplied to the tank, said last-named means including a releasable locking means for the float for a predetermined upper position and for a predetermined lower position of the float, respectively, releasable by the action of the water in the tank on the float when the water level reaches the predetermined level below and above the level corresponding to the float positions in the predetermined upper and lower locking positions, respectively, a float rod on which the float is mounted, a board member projecting into the tank having a vertical edge along which the float rod moves, the releasable locking means for the float provided at the lower level consisting of an arm projecting beyond the edge of the board member in one position, while not projecting beyond said board member in other positions, said arm being pivotally held on its pivot pin on the board member, and a trigger float connected with said arm determining the positions of the same and moving the arm into an ineffective position when a predetermined high level of the water in the tank has been reached.

3. A dispensing system for liquid filled tanks provided with means for automatically supplying liquid to the tank upon withdrawal of liquid from the same at the rate of the actual withdrawal, said system including means for supplying the liquid in the tank with a liquid conditioning agent, comprising an automatic supply means for the tank including a liquid conducting means, an automatic regulation means for the liquid supply means operated by a float suspended on the float rod, supplying liquid when the level of the liquid in the tank is lowered, a container for the liquid conditioning agent, ejector means feeding the conditioning agent to the liquid supplied to the tank when the level of the liquid in the tank drops, said ejector means including a suction pipe by which suction is produced by the inflow of liquid into the tank, and means to keep the flow rate of the inflow of liquid into the tank at a constant value which is independent of the rate of withdrawal of liquid from the tank, said last-named means including a float locking means keeping the float in a position corresponding to the predetermined normal level until a predetermined level difference between said level and the level reached during withdrawal has been reached unlocking the float, said float locking means including a board member projecting into the tank and having a vertical edge along which the float rod moves, two locking and releasing devices for said float rod each consisting of a pivoted arm the end of which projects slightly beyond the vertical edge of the board member in one position and is withdrawn behind the vertical edge in other positions when moved around the pivot, said pivot being mounted on the board member and said locking and releasing devices being disposed one below the other at a predetermined distance, auxiliary floats connected with each of said arms, rotating the arms around the pivots when the water level changes, the lowering of the water level lowering the auxiliary floats, producing release of the float rod of the water supply control float by one device, but locking of the said water supply controlling float in a position of greater depth by means of the other device, the rising water level thus producing release of the float rod in the lower position and locking of the float rod in the higher position.

4. A dispensing system for introducing a liquid conditioning agent into a tank automatically supplied with water at a rate corresponding to the withdrawal of water from the tank by means of a float controlling the water supply, comprising means for conveying the liquid conditioning agent into the tank together with the water supplied to the tank, said means including an ejector solely operated by and during the inflow of water into the tank and controlled by the said float, and means for maintaining the quantity of the liquid conditioning agent in exact proportion to the quantity of water supplied to the tank, said last-named means including a releasable locking means for the float for a predetermined upper position and for a predetermined lower position of the float, respectively, releasable by the action of the water in the tank on the float when the water level reaches a predetermined level below and above said level corresponding to the float positions in the predetermined upper and lower locking positions, respectively, said releasable locking means for the float in its upper position including a withdrawable resilient float support, the resistance of which is overcome by the weight of the float when unsupported by water to a predetermined extent, while the releasable locking means for the lower float position includes a withdrawable member controlled by an additional float withdrawing said withdrawable locking member into an ineffective position upon reaching a level which is at a predetermined height above the level at which the first-named float has been locked by the locking means.

References Cited in the file of this patent

UNITED STATES PATENTS

| | | |
|---|---|---|
| 734,144 | Stocker | July 21, 1903 |
| 1,934,791 | Butzler | Nov. 14, 1933 |
| 2,039,275 | McGrael | Apr. 28, 1936 |
| 2,057,027 | Hoover | Oct. 13, 1936 |
| 2,465,866 | Gaines | Mar. 29, 1949 |
| 2,524,966 | Eisenman | Oct. 10, 1950 |
| 2,558,469 | Travis | June 26, 1951 |

FOREIGN PATENTS

| | | |
|---|---|---|
| 2,741 | Great Britain | 1887 |
| 8,839 | Germany | June 1, 1879 |